(12) United States Patent
Putrevu et al.

(10) Patent No.: US 10,521,831 B2
(45) Date of Patent: Dec. 31, 2019

(54) SYSTEM FOR PAGE TYPE BASED ADVERTISEMENT MATCHING FOR SPONSORED PRODUCT LISTINGS ON E-COMMERCE WEBSITES AND METHOD OF USING SAME

(71) Applicant: Wal-Mart Stores, Inc., Bentonville, AR (US)

(72) Inventors: Jagannath Putrevu, Sunnyvale, CA (US); Shankara B. Subramanya, Santa Clara, CA (US); Madhusudan Mathihalli, Saratoga, CA (US); Girish Natarajan, Fremont, CA (US); Guoxun Yuan, San Jose, CA (US); Feng Guo, Los Gatos, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 678 days.

(21) Appl. No.: 14/611,020

(22) Filed: Jan. 30, 2015

(65) Prior Publication Data

US 2016/0225034 A1 Aug. 4, 2016

(51) Int. Cl.
*G06Q 30/00* (2012.01)
*G06Q 30/02* (2012.01)

(52) U.S. Cl.
CPC ..... *G06Q 30/0277* (2013.01); *G06Q 30/0255* (2013.01); *G06Q 30/0269* (2013.01)

(58) Field of Classification Search
CPC ................................................. G06Q 30/0277
See application file for complete search history.

(56) References Cited

U.S. PATENT DOCUMENTS

| | | | | |
|---|---|---|---|---|
| 5,327,484 A | * | 7/1994 | Connell | G06Q 20/4037 379/334 |
| 2002/0169657 A1 | * | 11/2002 | Singh | G06Q 30/0202 705/7.31 |
| 2003/0061402 A1 | * | 3/2003 | Yadav | H04L 29/12009 719/328 |
| 2003/0126013 A1 | * | 7/2003 | Shand | G06Q 30/02 705/14.52 |
| 2006/0095281 A1 | | 5/2006 | Chickering et al. | |
| 2009/0063268 A1 | | 3/2009 | Burgess et al. | |
| 2009/0327032 A1 | * | 12/2009 | Gunawardana | G06Q 30/02 705/14.42 |
| 2011/0047026 A1 | | 2/2011 | Biggs et al. | |
| 2011/0302031 A1 | * | 12/2011 | Chen | G06Q 30/02 705/14.53 |
| 2014/0229281 A1 | * | 8/2014 | Zimmerman, Jr. | G06Q 30/0256 705/14.54 |

* cited by examiner

*Primary Examiner* — Bennett M Sigmond
*Assistant Examiner* — Scott C Anderson
(74) *Attorney, Agent, or Firm* — Bryan Cave Leighton Paisner LLP

(57) ABSTRACT

A system and method includes receiving, by a computer system, one or more inputs of customer level information, advertisement page and page type level information, item level information, inventory constraints, competitor pricing, and seasonal requirements/rules, merging, by the computer system, the one or more inputs, receiving, by the computer system including a module selection and ranking engine, the merged data, and providing, by the computer system, output of one or more advertisements of sponsored product listings to a user device of a consumer for display.

21 Claims, 6 Drawing Sheets

FIG. 5

SYSTEM FOR PAGE TYPE BASED ADVERTISEMENT MATCHING FOR SPONSORED PRODUCT LISTINGS ON E-COMMERCE WEBSITES AND METHOD OF USING SAME

BACKGROUND OF THE INVENTION

1. Field of the Invention

The present invention relates generally to sponsored product listings on e-commerce websites and, more particularly, to a system for page type based advertisement matching for sponsored product listings on an e-commerce website and method of using same.

2. Description of the Related Art

It is known that a large retailer typically has a number of items or products stocked either in retail stores or distribution centers. The retailer advertises many of these items or products, for example, groceries, office supplies, household wares, etc. Typically, these advertisements appear on a webpage of a website of the retailer for allowing a consumer to search and/or purchase the products.

The website of the retailer typically hosts a variety of products curated in multiple advertisement formats to cater to different customer needs. For example, different advertisement formats include different advertisement types such as featured brands, e.g., sponsored products from a vendor or seller "X", or sponsored products, e.g., sponsored products from different vendors or sellers "X", "Y", "Z", etc. Typically, the website includes a homepage which gets the highest amount of traffic, search pages where users can search for products and get relevant results, category pages where users can see the different product offerings in different product categories, browse pages for browsing through a more specific category of items or products, topic pages which host highly relevant items or products related to a certain theme or topic, and finally product pages which are for individual items or products. Each page type has different characteristics and results in different types of user behavior.

For creating a successful performance advertisement program, certain goals for all the stakeholders involved need to be met and contribute to the long-term growth of the advertisement marketplace while maintaining high levels of customer satisfaction. For the consumer, the goal is to show the most contextually relevant advertisements, measured by the purchase (conversion) probability of the advertisement. For the advertiser, the goal is to target potential customers and increase discoverability of their products. The advertisers should be able to manage their products' reach by improving their bid prices or improve their performance by targeting specific customer segments. For the advertisement marketplace or the retailer, the goal is to rank the ads based on their performance in terms of conversions and ad revenues. If better products are ranked higher, it incentivizes advertisers to improve their product offerings, which improves the overall website conversions and brings in more revenues for both the advertisers and the retailer.

Performance advertisement (Ad) is a form of e-commerce advertising where a cost of advertising is based on a performance of an advertisement measured through impressions or clicks received by the advertisement. By virtue of the retailer's huge website catalog and presence on the e-commerce space, advertisements are a great platform for generating an additional source of revenue for the retailer. The current industry norm is to rely on one of the top advertisement platforms like Google Adsense to use the retailer dotcom's real estate to show third party advertisements. The Google Adsense program is designed based on keywords to incentivize advertising to improve their overall website experience. However, this approach has some disadvantages because of the potential bounces these advertisements can cause on the retailer's website pages. In addition, different sellers and products in an e-commerce marketplace have different conversion rates and profitability. Large eCommerce retailers can leverage their huge customer base and product offerings to attract sellers to advertise products from within the retailer's website and promote specific products.

It is, therefore, desirable to provide a new system and method which matches advertisements and pages for sponsored product listings on an e-commerce website for a large retailer. It is also desirable to provide a new system and method that optimizes each website page type and each landing page separately. It is further desirable to provide a new system and method that produces advertisement rank based on advertisers' "Performance" and increases advertising revenues. Thus, there is a need in the art to provide a system for page type based advertisement matching for sponsored product listings on an e-commerce website and method of using same that meets at least one of these desires.

SUMMARY OF THE INVENTION

Accordingly, the present invention provides a system including a computer system configured to provide output of one or more advertisements of sponsored product listings to a user device of a consumer. The computer system is also configured to receive one or more inputs of customer level information, advertisement page and page type level information, item level information, inventory constraints, competitor pricing, and seasonal requirements/rules. The computer system is further configured to merge the one or more inputs. The computer system includes a module selection and ranking engine being configured to receive the merged data, and being configured to provide output of one or more advertisements of sponsored product listings to the user device of the consumer for display.

In addition, the present invention provides a method including the steps of configuring a computer system to provide output of one or more advertisements of sponsored product listings to a user device of a consumer. The method also includes the steps of receiving, by the computer system, one or more inputs of customer level information, advertisement page and page type level information, item level information, inventory constraints, competitor pricing, and seasonal requirements/rules. The method further includes the steps of merging, by the computer system, the one or more inputs, receiving, by the computer system including a module selection and ranking engine, the merged data, and providing, by the computer system, as output of one or more advertisements of sponsored product listings to the user device of the consumer for display.

Further, the present invention provides one or more non-transitory computer-readable storage media, having computer-executable instructions embodied thereon, wherein when executed by at least one processor the computer-executable instructions cause the processor to receive one or more inputs of customer level information, advertisement page and page type level information, item level information, inventory constraints, competitor pricing, and seasonal requirements/rules information. The computer-executable instructions also cause the processor to merge the one or more inputs, to receive, by a module selection and ranking engine, the merged data, and to provide output of one or more advertisements of sponsored product listings to the user device of the consumer for display.

One advantage of the present invention is that a new system and method is provided for page type based advertisement matching for sponsored product listings on an e-commerce website for a large retailer. Another advantage of the present invention is that the system and method provides an ad-match, which maximizes ad performance by tailoring ads for each page type in an e-commerce website for a large retailer. Yet another advantage of the present invention is that the system and method serves many different website page types with varying levels of contextual and consumer information, e.g., different levels of information for each website page and provides relevant targeted advertisements from the large retailer's own website catalog, thereby reducing bounce rate on website pages, increasing website page visits to products, and potentially improving overall website conversions, by creating an auction platform for the retailer's sellers or vendors to bid for advertisement placements and charge them based on a Cost-per-click (CPC) model and maintaining industry standard return on advertising spending (ROAS) metrics. Still another advantage of the present invention is that the system and method provides the most contextually relevant advertisement to the user (measured by Conversion Probability of the advertisement). A further advantage of the present invention is that the system and method provides liquidity to advertisers, e.g., bid more to get more revenue, fine grained control: segmentation of customers and pages, for example Broad-match Ads vs. Exact match Ads, and predictability in ROAS. Yet a further advantage of the present invention is that the system and method produces advertisement rank based on advertisers' "Performance", continuously improving conversion rates: the more the customers buy after clicking the advertisements, the better, increasing advertisement revenues and advertisement attributed revenues, and timely and accurate reporting on all KPIs.

Other features and advantages of the present invention will be readily appreciated, as the same becomes better understood, after reading the subsequent description taken in conjunction with the accompanying drawings.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 5 is a screenshot view of an image on the user device using the system of FIG. 1.

Figure 1:
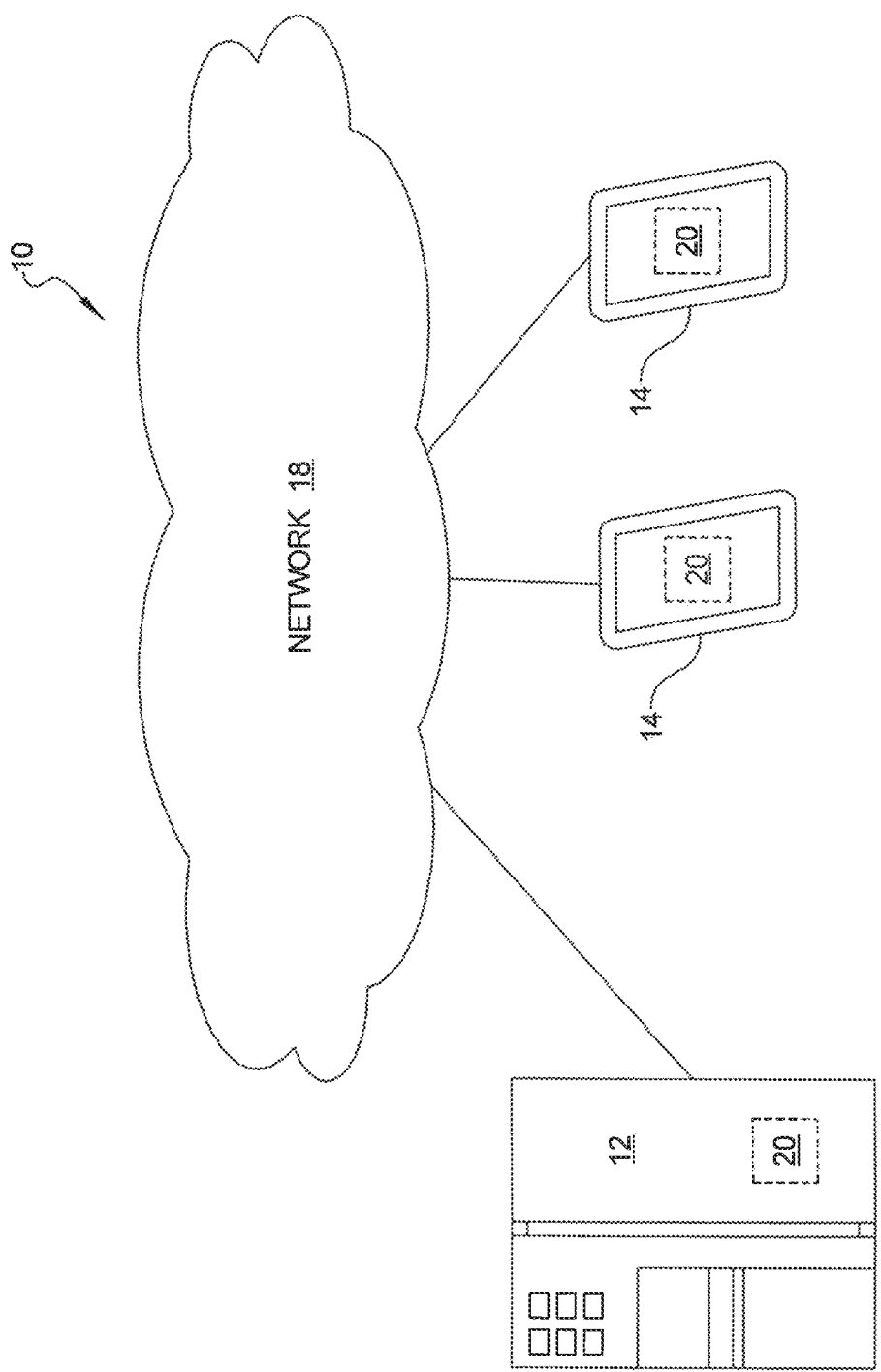
FIG. 1 is a diagrammatic view of a system, according to one embodiment of the present invention, illustrated in relationship with at least one user device of a consumer.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION OF THE PREFERRED EMBODIMENT(S)

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

Different page types have different contextual information and user intent and goals. The disclosure particularly describes how a large retailer may provide page type based advertisement matching for sponsored product listings on an e-commerce website for the retailer. Particularly, the present invention describes how a system and method provides an ad-match to website page type for advertisers' products on a website of a large retailer.

With reference to the FIGS. and in operation, the present invention provides a system 10, methods and computer product media that matches advertisements to page type for sponsored product listings on an e-commerce website for a large retailer. In particular, the present invention describes an ad-match system which maximizes ad performance by tailoring ads for each page type in an e-commerce website and to provide output of one or more advertisements of sponsored product listings to a user device of a consumer for display.

Referring to FIG. 1, an exemplary environment in which the system 10, according to the present invention, operates is illustrated. The system 10 in which methods described hereinbelow may be implemented. The system 10 may include a server system 12 that may be embodied as one or more server computers each including one or more processors that are in data communication with one another. The server system 12 may be in data communication with one or more user devices 14. In the methods disclosed herein, the user devices 14 are advantageously mobile devices such as a mobile phone or tablet computer. In some embodiments, some or all of the methods disclosed herein may be performed using a user device 14 such as a desktop computer or any other computing device as the user device 14. For purposes of this disclosure, discussion of communication with a user or entity or activity performed by the user or entity may be interpreted as communication with a user device 14 associated with the user or entity or activity taking place on a computer associated with the user or entity. In some embodiments, separate computers of the server system 12 may handle communication with the user devices 14.

Some or all of the server 12 and user devices 14 may communicate with one another by means of a network 18. The network 18 may be embodied as a peer-to-peer wireless connection between devices, a connection through a local area network (LAN), WiFi network, the Internet, or any other communication medium or system.

Figure 2:
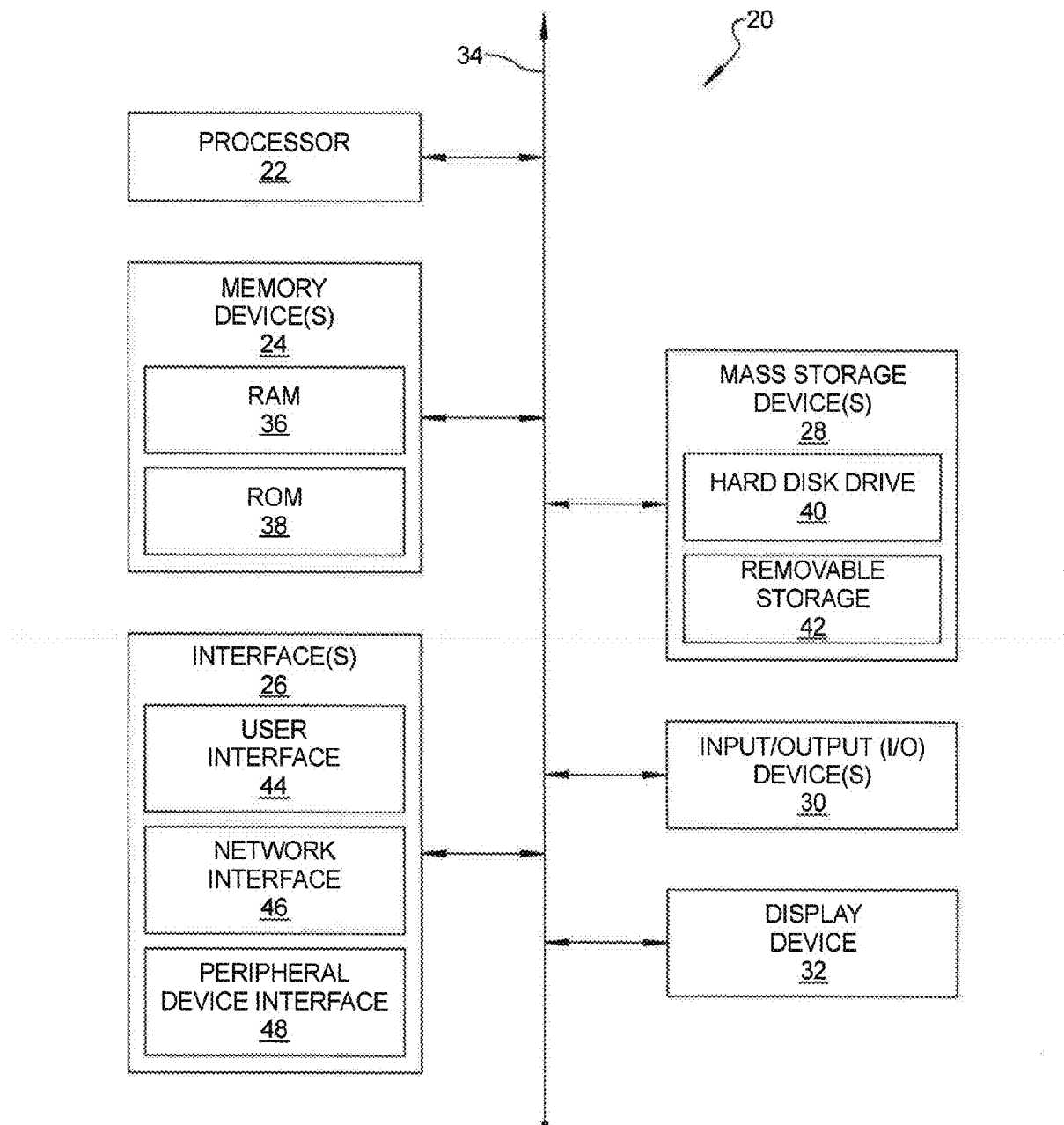
FIG. 2 is a diagrammatic view of a portion of the system of FIG. 1.

Referring to FIG. 2, an example computing device 20 for the system 10 and user device 14 is shown. The computing device 20 may be used to perform various procedures, such as those discussed herein. A sponsored product module may include some or all of the attributes of the computing device 20. The computing device 20 can function as a server, a user, or any other computing entity. The computing device 20 can perform various monitoring functions as discussed herein, and can execute one or more application programs, such as the application programs described herein. The computing device 20 can be any of a wide variety of computing devices, such as a desktop computer, a notebook computer, a server computer, a handheld computer, tablet computer and the like.

The computing device 20 includes one or more processor(s) 22, one or more memory device(s) 24, one or more interface(s) 26, one or more mass storage device(s) 28, one or more Input/Output (I/O) device(s) 30, and one or more display device(s) 32, all of which are coupled to one or more bus(es) 34. The processor(s) 22 include one or more processors or controllers that execute instructions stored in memory device(s) 24 and/or mass storage device(s) 28. The processor(s) 22 may also include various types of computer-readable media, such as cache memory.

The memory device(s) 24 include various computer-readable media, such as volatile memory (e.g., random access memory (RAM) 36) and/or nonvolatile memory (e.g., read-only memory (ROM) 38). The memory device(s) 24 may also include rewritable ROM, such as Flash memory.

The mass storage device(s) 28 include various computer readable media, such as magnetic tapes, magnetic disks, optical disks, solid-state memory (e.g., Flash memory), and so forth. As illustrated in FIG. 2, a particular mass storage device is a hard disk drive 40. Various drives may also be included in mass storage device(s) 28 to enable reading from and/or writing to the various computer readable media. The mass storage device(s) 28 include removable media 42 and/or non-removable media.

The I/O device(s) 30 include various devices that allow data and/or other information to be input to or retrieved from computing device 20. Example I/O device(s) 30 include cursor control devices, keyboards, keypads, microphones, monitors or other display devices, speakers, printers, network interface cards, modems, lenses, CCDs or other image capture devices, and the like.

The display device(s) 32 include any type of device capable of displaying information to one or more users of computing device 20. Examples of the display device 32 include a monitor, display terminal, video projection device, display, graphical user interface (GUI), and the like.

The interface(s) 26 include various interfaces that allow the computing device 20 to interact with other systems, devices, or computing environments. The interface(s) 26 may include one or more user interface 44 such as GUIs. The interface(s) 26 may include one or more network interfaces 46. Example interface(s) 26 may include any number of different network interfaces 46, such as interfaces to local area networks (LANs), wide area networks (WANs), wireless networks, and the Internet. The interface(s) 26 may also include one or more peripheral device interfaces 48 such as interfaces for printers, pointing devices (mice, track pad, etc.), keyboards, and the like.

The bus(es) 34 allow the processor(s) 22, memory device(s) 24, interface(s) 26, mass storage device(s) 28, I/O device(s) 30, and display(s) 32 to communicate with one another, as well as other devices or components coupled to the bus 34. The bus 34 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of the computing device 20, and are executed by the processor(s) 22. In some embodiments, the systems and procedures described herein can be implemented in hardware, or a combination of hardware, software, and/or firmware. For example, one or more application specific integrated circuits (ASICs) can be programmed to carry out one or more of the systems and procedures described herein.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . The functions as performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

Figure 3:
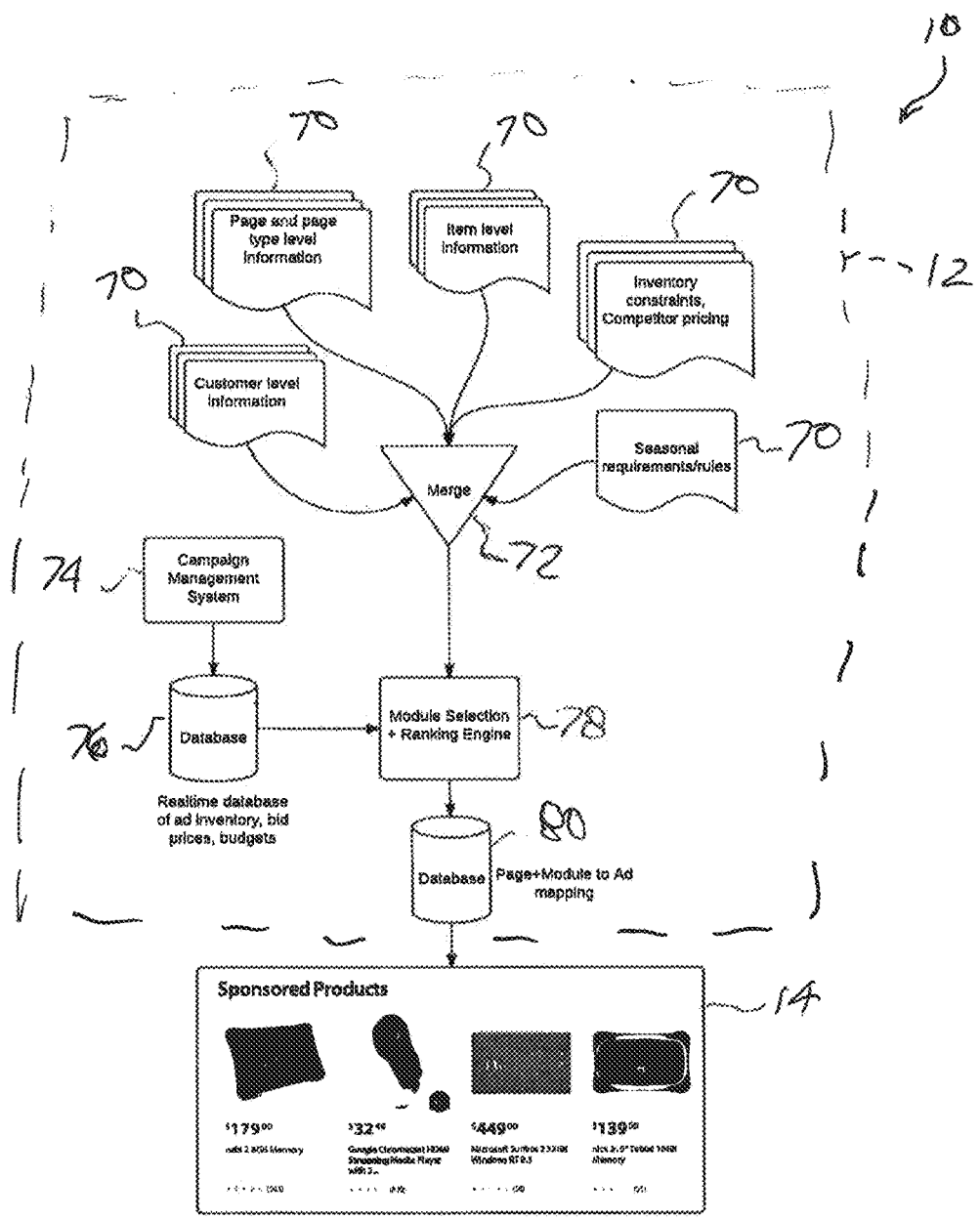
FIG. 3 is a diagrammatic view of one embodiment of the system and user device of FIG. 1.
Figure 4:
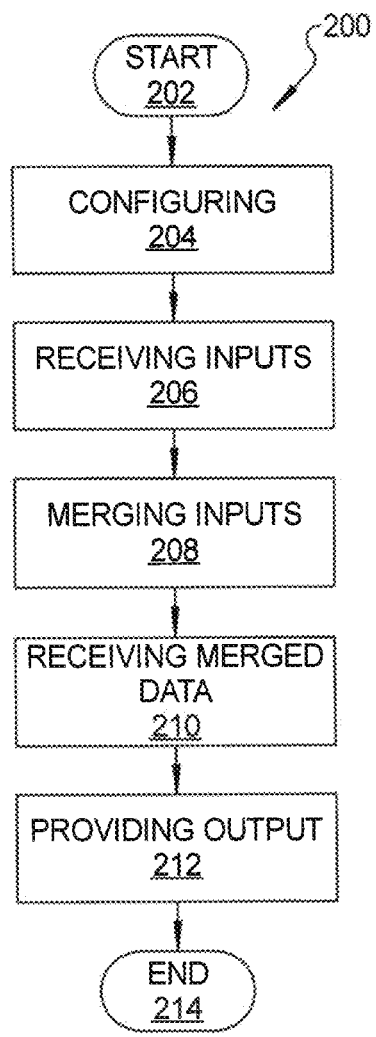
FIG. 4 is a flowchart of a method, according to one embodiment of the present invention, used with the system of FIGS. 1 through 3.

Referring to FIG. 3, one embodiment of the system 10 is shown for website page type advertisement matching for sponsored product listings on e-commerce websites. Different page types have different contextual information and user intent and goals. The present invention describes an ad-match system which maximizes ad performance by tailoring ads for each page type in an e-commerce website. In one embodiment, the system 10 includes one or more servers or databases 70 having information. In the embodiment illustrated, the system 10 may include a server or database 70 having customer level information of the retailer used as an input. The system 10 may include a server or database 70 having website page and page type level information of the retailer used as an input. The system 10 may include a server or database 70 having item or product level information of the retailer used as an input. The system 10 may include a server or database 70 having inventory constraints and competitor pricing information of the retailer used as an input. The system 10 may include a server or database 70 having seasonal requirements/rules information of the retailer used as an input. It should be appreciated that the server or database 70 may contain a module and provide an output to a database or other module. It should also be appreciated that the server may contain the database or communicate with the database.

The system 10 also includes a merge module 72 receiving one or more inputs from the servers or databases 70. The merge module 72 merges the inputs and produces an output to a module selection and ranking engine 78 to be described. It should be appreciated that the server 12 may contain the merge module 72 and provide an output to a database or other module.

The system 10 includes a campaign management system 74. The campaign management system 74 includes a server or database that manages an advertising campaign for the retailer. The campaign management system 74 provides an output to a database 76. The system 10 includes a real-time database 76 of advertisement inventory, bid prices, and budgets for the retailer as previously described. The database 76 receives this information from the campaign management system 74. It should be appreciated that the campaign management system 74 may contain a server or module and provide an output to the database 76 or other module. It should also be appreciated that the server may contain the database or communicate with the database or other module.

The system 10 further includes a module selection and ranking engine 78. The module selection and ranking engine 78 receives one or more inputs. The module selection and ranking engine 78 receives input from the database 76 and from the merge module 72. The module selection and ranking engine 78 provides an output to a database 80 to be described. It should be appreciated that the server 12 may contain the module selection and ranking engine 78 and provide an output to the database 80 or other module. It should also be appreciated that the server 12 may contain the module selection and ranking engine 78 or communicate with the module selection and ranking engine 78.

The system 10 also includes a database 80 receiving output from the module selection and ranking engine 78. The database 80 includes a website landing page plus module to advertisement mapping. The database 66 provides one or more advertisements of sponsored product listings on the retailer's website landing page to the user device 14 for display to the consumer. It should be appreciated that the advertisement displays one or more sponsored products listings. It should be appreciated that the server 12 may contain the database 66 or communicate with the database 66 and the database 66 communicates with the display of the user device 14.

Referring to FIG. 5, a flowchart of a method 200, according to the present invention, of website page type based advertisement matching for sponsored product listings on e-commerce websites is used with the system 10 of FIGS. 1 through 3 is shown. The method 200 may be embodied in a sponsored products module for the system 10. The method 200 starts in block 202. The method 200 includes the step of configuring the system 10 to provide output of one or more advertisements of sponsored product listings to the user device 14 of a consumer in block 204. The method 200 also includes the step of receiving one or more inputs in block 206. For example, receiving, by the system 10, one or more inputs of customer level information, advertisement page and page type level information, item or product level information, inventory constraints, competitor pricing, and seasonal requirements/rules. The method 200 further includes the step of merging the one or more inputs in block 208. For example, merging, by the system 10, the one or more inputs. The method 200 includes the step of receiving the merged inputs or data in a module selection and ranking engine in block 210. For example, receiving, by the system 10 with the module selection and ranking engine 78, the merged inputs or data. The method 200 includes the step of providing output in block 212. For example, providing, by the system 10, output of one or more advertisements of the sponsored product listings to the user device 14 of the consumer for display. The method then ends in block 214. It should be appreciated that a sponsored products module by a server of the system 10 associated with the user device 14 or a separate entity may provide the advertisements in order to provide content to the user devices 14.

Advertisement (Ad) Format

The website of the retailer hosts a variety of products curated in multiple formats to cater to different customer needs. The website of the retailer includes a homepage that gets the highest amount of traffic, search pages where users can search for products and get relevant results, category pages where users can see the different product offerings in different product categories, browse pages for browsing through a more specific category of items, topic pages which host highly relevant items or products related to a certain theme or topic and finally product pages which are for individual items or product. Each page type has different characteristics and results in different types of user behavior. By optimizing for each page type and each landing page separately, the set goals previously described can be achieved for all stakeholders and derive maximum impact. The retailer has two different advertisement formats viz., "Featured products from <Brand>", "Sponsored Products" to give advertisers the flexibility to choose what works best for them.

Segmentations for Advertisers

To meet the goal of giving advertisers fine-grained control over their inventory, it is important to go to a granular level and segment the Ads. There are three types of segmentations: page type level segmentation—Ads on homepage get lot more impressions than on other page types; taxonomy/site category based segmentation—expected revenue varies across different product categories for every advertiser; and relevance segmentation—query based ranking: Broad Match vs. Exact Match; item match ranking: Estimated CTR and Estimated Revenue; and popularity match ranking: Direct Match vs. Indirect Match.

Models for Ranking Products

The approach to rank the products which are to be shown on a given page type in a given format for a given customer depends on several qualitative and quantitative attributes: bid price b: the cost per click for the advertiser; CTR: the unbiased estimate of click through rate for a given ad on a given landing page; customer profile C: a set of attributes which depend on the customer's past viewing history and purchase history, which can act as a penalty/boost for an advertisement's rank; and probability p is the conversion probability previously described.

The rank of an ad is therefore a function of above attributes: fn(b, CTR, p, C). By taking this approach, the system 10 will make the trade-off between bid price and conversion probability so that a product with higher probability of conversion will have to pay lesser to rank higher, thereby incentivizing the advertisers and brands to improve their product quality and increase conversions.

Apart from CTR, all the other attributes of the ranking function are dependent on the sponsored product and not on the page type or ad format. Unbiased expected CTR can be a proxy metric for pure contextual relevance of an advertisement. This is different for different page types. For example, search pages: a textual analytic metric like TF-IDF (Term Frequency-Inverse Document Frequency) score; category/shelf pages: TF-IDF for keyword based ranking and normalized rank score for popularity based ranking; home page: normalized rank score; and product pages: statistical model trained on the large amount of data the retailer already has on customers' responses to personalized recommendation modules on different retailer website pages.

CTR Estimation

For product pages, a CTR model predicts the probability that a customer will click on a sponsored product given a parent product page. If View is defined as an event which is the act of impressing a sponsored item on a product page P, and Click as an event which is the act of clicking on a sponsored item I, the goal is to estimate ctr=Prob(Click$_i$=1|View$_i$=1). In one embodiment, this is modeled as a logistic regression problem where the probability of click:

$$ctr = \frac{1}{1 + \exp(-(\beta_0 + \beta_1 x_1 + \cdots + \beta_n x_n))},$$

$[x_1, x_2, \ldots, x_n]$ is a set of significant features and $[\beta_0, \beta_1, \ldots, \beta_n]$ are a set of coefficients. This can be re-written as $$\log\left(\frac{ctr}{1 - ctr}\right) = \beta_0 + \beta_1 x_1 + \cdots + \beta_n x_n$$

This is now a linear regression model to estimate $$\logit(ctr) = \log\left(\frac{ctr}{1 - ctr}\right).$$

Some of the features considered for modeling this problem are item name text similarity score, price ratio between product page item and sponsored item, the ratings and reviews of both parent item and sponsored item, relevance score between items across common topics which both items belong to, taxonomies and their similarities of parent item and sponsored item, number of page visits for parent item and sponsored item, number of visits where a user went from parent item page to sponsored item page, probability that these two items are visited in the same session, etc.

One of the key challenges for solving this problem is the inherent bias in the CTR data collected. The module has a carousel and therefore can host multiple ads in the range 4-20 on any given item page. It should be appreciated that, depending on the consumer's Internet browser width, the number of ads seen by the customer can vary.

Referring to FIG. 5, the image indicates how the sponsored products module looks like on the large retailer website item pages. As illustrated, the top 4-6 items (varying based on browser window width) get more visits than the ones that are later in the pecking orders. So for the estimation model, the bias has to be corrected for that position of the item in the module creates for items shown on the left most side of the page.

Figure 6:
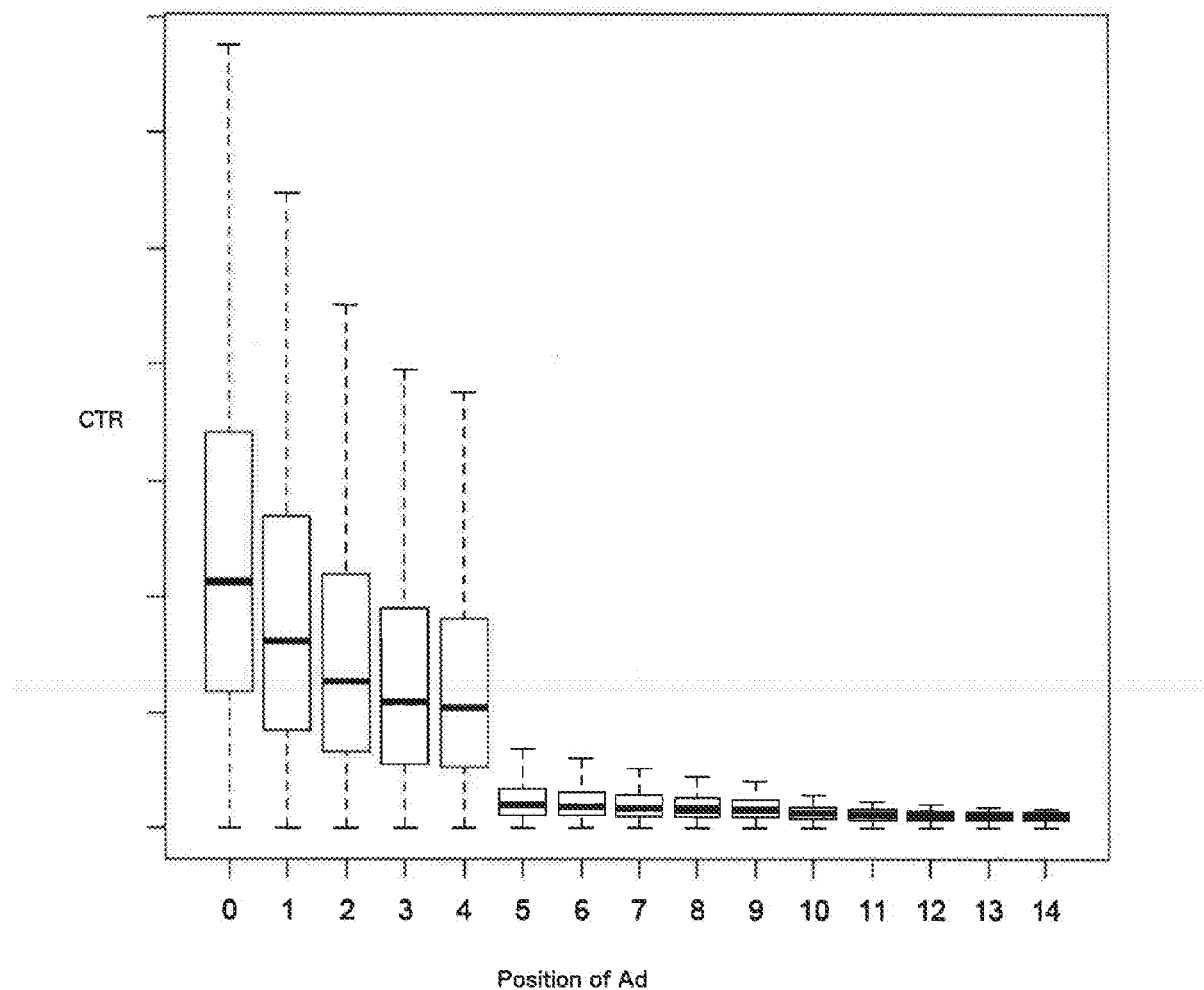
FIG. 6 is a graphical view of bias in a click through rate estimation model of the system of FIG. 1.

Referring to FIG. 6, a decreasing pattern is seen in the average CTR values going to positions 5 and above (numbered from 0 to 14). In positions 0 to 4, some of the trend is because of the inherent difference in the relevance of the items and these items were ranked to be shown in that order based on relevance scores. But by running some experiments on showing the same item in different positions, some positional effects were noticed even in positions 0 to 4. It should be appreciated that this position bias needs to be eliminated for an unbiased estimate of CTR.

An Examination Hypothesis proposed by Richardson et al. is used to model and eliminate position bias. See Matthew Richardson, Ewa Dominowska, and Robert Ragno. Predicting clicks: estimating the click-through rate for new ads. In WWW '07: Proceedings of the 16$^{th}$ international conference on World Wide Web, pages 521-520, New York, N.Y., USA, 2007. ACM Press, the disclosure of which is hereby expressly incorporated by reference. The probability that an ad item is clicked depends on the probability that it is examined and the probability that is clicked on, given that it is examined.

$$\begin{aligned} &Prob(\text{click} = 1 \mid \text{item} = i, \text{position} = p) \\ &= \frac{P(\text{click} = 1 \mid \text{item} = i, \text{position} = p, \text{examined} = 1) * P(\text{examined}}{= 1 \mid \text{item} = i, \text{position} = p} \end{aligned}$$

This hypothesis assumes that the probability that an ad item is clicked on but not viewed is zero. It also assumes that the probability that an ad item is clicked is independent of its position, given that it is viewed, and that the probability of an ad item is viewed is independent of the ad, given the position and independent of other ads shown:

$$Prob(\text{click} = 1 \mid \text{item} = i, \text{position} = p) = P(\text{click} = 1 \mid \text{item} = i, \text{examined} = 1) * P(\text{examined} = 1 \mid \text{position} = p)$$

The CTR would therefore be the expression Prob (Click=1|item=i, examined=1).

From the data, the value of CTR can be estimated and by running experiments involving showing the same ad in multiple positions in the same module on the same page, the examination probability of a given position in a given module on a given page can be estimated. Using these two values, the true CTR of the item without any position bias can be obtained.

Conversion Probability Estimation

The conversion probability for a given sponsored item or product is defined as the probability at which a customer will buy the item i, after viewing it $p_i$=Prob(Buy$_i$1|View$_i$=1). Two models for this problem were considered: 1) regression; and 2) non-linear tress based models like RandomForest. The feature sets for both the models include variables like availability, price, competitor's price, brand value, rating and reviews, etc.

Personalization

The retailer performance ad ranking is based on contextual matching but an added degree of personalization can help optimize better for performance. Personalization of ads for an individual customer is critical on low-context website pages like home and category pages. The generic nature of these website pages makes it necessary to show ads related to users browsing and purchase history. For other website page types like product pages, browse session level personalization will enable some amount of product rotation. In other words, if a customer has already seen a product and not clicked on it, then the probability of a click on the subsequent impression is likely to drop. The resultant rotation generates feedback data for improving models to estimate customer level CTR or Conversion Probability. Personalization in high-context website pages like product and search pages can also increase coverage in cases where there are no directly relevant ads for the context, but sponsored products based on customers' purchase and browsing history can act as a backfill.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A computer system comprising:
   one or more computer processors; and
   one or more non-transitory memory storage systems storing computing instructions configured to run on the one or more computer processors, wherein:
   the computer system is configured to provide, by a campaign management system of the computer system, output of one or more advertisements for a sponsored product to a graphical user interface of a user device of a customer, the one or more advertisements customized to fit a particular page type having a particular page format of a website of a retailer, wherein the campaign management system communicates with a selection and ranking engine and a database;
   the computer system is configured to receive, by the one or more computer processors, customer information of the retailer to be used as one or more inputs in the database comprising (1) a purchase history for a group of items associated with the customer information, wherein the group of items comprises the sponsored product and one or more other items, (2) a viewing history for the group of items associated with the customer information, (3) page type information regarding one or more characteristics associated with one or more webpages, (4) item information of the group of items related to (a) the purchase history associated with the customer information and (b) the viewing history associated with the customer information, (5) inventory constraints associated with the group of items, (6) competitor pricing associated with the group of items, and (7) seasonal requirements information associated with the group of items;
   the computer system is configured to analyze, by the one or more computer processors, the one or more inputs of the purchase history, the viewing history, the page type information, the item information, the inventory constraints, the competitor pricing, and the seasonal requirements information; the computer system is configured to merge, by the one or more computer processors, the one or more inputs of the purchase history, the viewing history, the page type information, the item information, the inventory constraints, the competitor pricing, and the seasonal requirements information to create merged data;

the computer system comprises the selection and ranking engine; the selection and ranking engine is configured to receive, by the one or more computer processors, the merged data; the computer system is configured to adjust, by the one or more computer processors, a rank of the one or more advertisements of the sponsored product as a function of the merged data and a set of attributes calculated using fn(b, CTR, p, C), wherein the set of attributes comprises the sponsored product to be displayed on a given page type having a given page format for a particular customer based on at least a bid price b submitted by an advertiser, a cost per click to the advertiser, an unbiased estimate of a click through rate (CTR) for a particular advertisement of the one or more advertisements on a particular landing page of the website for the sponsored product, a customer profile C, and a conversion probability p;

based on the rank of the one or more advertisements, the computer system is configured to automatically move one of the one or more advertisements of the sponsored product that is ranked higher than other advertisements in the one or more advertisements for the sponsored product to be positioned closest to a left side on a landing page of the website; and the computer system is configured to provide, by the one or more computer processors, output of the one or more advertisements of the sponsored product to the user device of the customer for display on the graphical user interface of the user device of the customer based on the rank of the one or more advertisements of the sponsored product based on the merged data and the set of attributes.

2. A system, as set forth in claim 1, wherein said computer system includes a real-time database of advertisement inventory to be provided as an input into the selection and ranking engine.

3. A system, as set forth in claim 1, wherein said computer system includes a real-time database of one or more landing pages of the website and for the sponsored product in addition to an advertisement mapping engine receiving output from the selection and ranking engine.

4. A system, as set forth in claim 3, wherein the campaign management system provides an input to the real-time database.

5. A system, as set forth in claim 1, wherein the computer system includes a server providing the customer information as one of the one or more inputs.

6. A system, as set forth in claim 1, wherein the computer system includes a server providing the page type information as one of the one or more inputs.

7. A system, as set forth in claim 1, wherein the computer system includes a server providing the item information as one of the one or more inputs.

8. A system, as set forth in claim 1, wherein the computer system includes a server providing the inventory constraints and the competitor pricing as two of the one or more inputs.

9. A system, as set forth in claim 1, wherein the computer system includes a server providing the seasonal requirements information as one of the one or more inputs.

10. A system, as set forth in claim 3, wherein the sponsored product is provided from the real-time database of the one or more landing pages of the website and for the sponsored product in addition to the advertisement mapping engine.

11. A method comprising:

configuring, a computer system using one or more processors by a campaign management system, to provide output of one or more advertisements for a sponsored product to a graphical user interface of a user device of a customer, the one or more advertisements customized to fit a particular page type having a particular page format of a website of a retailer, wherein the campaign management system communicates with a selection and ranking engine and a database;

receiving, with the computer system, customer information of the retailer to be used as one or more inputs in the database comprising (1) a purchase history for a group of items associated with the customer information, wherein the group of items comprises the sponsored product and one or more other items, (2) a viewing history for the group of items associated with the customer information, (3) page type information regarding one or more characteristics associated with one or more webpages, (4) item information of the group of items related to (a) the purchase history associated with the customer information and (b) the viewing history associated with the customer information, (5) inventory constraints associated with the group of items, (6) competitor pricing associated with the group of items, and (7) seasonal requirements information associated with the group of items;

analyzing, with the computer system, the one or more inputs of the purchase history, the viewing history, the page type information, the item information, the inventory constraints, the competitor pricing, and the seasonal requirements information;

merging, with the computer system, the one or more inputs of the purchase history, the viewing history, the page type information, the item information, the inventory constraints, the competitor pricing, and the seasonal requirements information to create merged data;

receiving, with the computer system including the selection and ranking engine, the merged data;

adjusting, with the computer system, a rank of the one or more advertisements of the sponsored product as a function of the merged data and a set of attributes calculated using fn(b, CTR, p, C), wherein the set of attributes comprises the sponsored product to be displayed on a given page type having a given page format for a particular customer based on at least a bid price b submitted by an advertiser, a cost per click to the advertiser, an unbiased estimate of a click through rate (CTR) for a particular advertisement of the one or more advertisements on a particular landing page of the website for the sponsored product, a customer profile C, and a conversion probability p;

based on the rank of the one or more advertisements, the computer system is configured to automatically move one of the one or more advertisements of the sponsored product that is ranked higher than other advertisements in the one or more advertisements for the sponsored product to be positioned closest to a left side on a landing page of the website; and displaying, with the computer system, as output the one or more advertisements of the sponsored product to the user device of the customer for display on the graphical user interface of the user device of the customer based on the rank of the one or more advertisements of the sponsored product based on the merged data and the set of attributes.

12. A method, as set forth in claim 11, further comprising providing, with the computer system, a real-time database of advertisement inventory as an input into the selection and ranking engine.

13. A method, as set forth in claim 11, further comprising providing, with the computer system, a real-time database of one or more landing pages of the website for the sponsored product in addition to an advertisement mapping engine receiving output from the selection and ranking engine.

14. A method, as set forth in claim 13, wherein the campaign management system provides an input to the real-time database.

15. A method, as set forth in claim 11, further comprising providing the customer information as one of the one or more inputs.

16. A method, as set forth in claim 11, further comprising providing the page type information as one of the one or more inputs.

17. A method, as set forth in claim 11, further comprising providing the item information as one of the one or more inputs.

18. A method, as set forth in claim 11, further comprising providing the inventory constraints and the competitor pricing as two of the one or more inputs.

19. A method, as set forth in claim 11, further comprising providing the seasonal requirements information as one of the one or more inputs.

20. A method, as set forth in claim 13, further comprising providing the sponsored product from the real-time database of the one or more landing pages of the website for the sponsored product in addition to the advertisement mapping engine receiving output from the selection and ranking engine.

21. One or more non-transitory computer-readable storage media, having computer-executable instructions embodied thereon, and configured to run on at least one processor, the one or more non-transitory computer-readable storage media comprising:

provide output of one or more advertisements for a sponsored product to a graphical user interface of a user device of a customer, by a campaign management system, the one or more advertisements customized to fit a particular page type having a particular page format of a website of a retailer, wherein the campaign management system communicates with a selection and ranking engine and a database;

receive customer information of the retailer to be used as one or more inputs in the database comprising (1) a purchase history for a group of items associated with the customer information, wherein the group of items comprises the sponsored product and one or more other items, (2) a viewing history for the group of items associated with the customer information, (3) page type information regarding one or more characteristics associated with one or more webpages, (4) item information of the group of items related to (a) the purchase history associated with the customer information and (b) the viewing history associated with the customer information, (5) inventory constraints associated with the group of items, (6) competitor pricing associated with the group of items, and (7) seasonal requirements information associated with the group of items;

analyze the one or more inputs of the purchase history, the viewing history, the page type information, the item information, the inventory constraints, the competitor pricing, and the seasonal requirements information;

merge the one or more inputs of the purchase history, the viewing history, the page type information, the item information, the inventory constraints, the competitor pricing, and the seasonal requirements information to create merged data;

receive, by the selection and ranking engine, the merged data;

adjust a rank of the one or more advertisements of the sponsored product as a function of the merged data and a set of attributes calculated using fn(b, CTR, p, C), wherein the set of attributes comprise the sponsored product to be displayed on a given page having a given page format for a particular customer based on at least a bid price b submitted by an advertiser, a cost per click to the advertiser, an unbiased estimate of a click through rate (CTR) for a particular advertisement of the one or more advertisements on a particular landing page of the website for the sponsored product, a customer profile C, and a conversion probability p;

based on the rank of the one or more advertisements, a computer system is configured to automatically move one of the one or more advertisements of the sponsored product that is ranked higher than other advertisements in the one or more advertisements for the sponsored product to be positioned closest to a left side on a landing page of the website; and display output of the one or more advertisements of the sponsored product to the user device of the customer for display on the graphical user interface of the user device of the customer based on the rank of the one or more advertisements of the sponsored product based on the merged data and the set of attributes.

* * * * *